United States Patent
Chan et al.

(10) Patent No.: US 8,102,619 B2
(45) Date of Patent: Jan. 24, 2012

(54) AIRBORNE PARTICLE TRAP WITHIN AN ENCLOSURE CONTAINING SENSITIVE EQUIPMENT

(75) Inventors: Yeow Yong Chan, Singapore (SG); Shaoyong Liu, Singapore (SG); Jing Fang Pan, Singapore (SG); Yi Zhao Yao, Singapore (SG)

(73) Assignee: Hitachi Global Storage Technologies Netherlands B.V. (NL)

( * ) Notice: Subject to any disclaimer, the term of this patent is extended or adjusted under 35 U.S.C. 154(b) by 546 days.

(21) Appl. No.: 12/350,124

(22) Filed: Jan. 7, 2009

(65) Prior Publication Data

US 2010/0172051 A1  Jul. 8, 2010

(51) Int. Cl.
*G11B 33/14* (2006.01)

(52) U.S. Cl. .................. 360/97.02; 360/97.04; 360/97; 360/69

(58) Field of Classification Search ............ 360/97, 360/97.02, 69, 97.04
See application file for complete search history.

(56) References Cited

U.S. PATENT DOCUMENTS

| | | |
|---|---|---|
| 4,857,087 A | 8/1989 | Bolton et al. |
| 5,034,837 A | 7/1991 | Schmitz |
| 5,869,009 A | 2/1999 | Bellefeuille et al. |
| 5,956,204 A | 9/1999 | Dunfield et al. |
| 6,296,691 B1 | 10/2001 | Gidumal |
| 6,603,632 B1 | 8/2003 | Lee |
| 6,636,379 B2 * | 10/2003 | Rannow et al. ............. 360/97.02 |
| 7,046,469 B2 * | 5/2006 | Tanaka ............................ 360/69 |
| 7,064,920 B2 * | 6/2006 | Fujiwara et al. ........... 360/97.02 |
| 2006/0272507 A1 | 12/2006 | Johnson |

FOREIGN PATENT DOCUMENTS

| | | |
|---|---|---|
| GB | 2043986 B2 | 10/1980 |
| JP | 2005-225755 B4 | 9/1993 |
| JP | 2000-222852 B4 | 8/2000 |
| JP | 2000-268522 B4 | 9/2000 |
| JP | 2007-004965 B4 | 1/2007 |

* cited by examiner

*Primary Examiner* — Connie Yoha
(74) *Attorney, Agent, or Firm* — Mahamedi Paradice Kreisman LLP; Christopher J. Brokaw

(57) ABSTRACT

A method and apparatus for a filter for filtering airborne particles present within an enclosure containing equipment sensitive is provided. The filter may be used within the enclosure of a hard disk drive. The filter may comprise a magnetic plate enclosed by a protective layer, which in turn may be enclosed by a non-woven scrim. The magnetic plate has a magnetic property that generates a magnetic field attractive to paramagnetic particles within the enclosure. The protective layer forms a barrier that prevents particles of the magnetic plate from entering into the enclosure. The non-woven scrim may, but need not, have an adhesive property which traps non-paramagnetic particles coming in contact with the non-woven scrim. If the non-woven scrim lacks an adhesive property, then at least a portion of the non-woven scrim may be coated with an adhesive layer which traps non-paramagnetic particles coming in contact with the non-woven scrim.

21 Claims, 6 Drawing Sheets

AIRBORNE PARTICLE TRAP WITHIN AN ENCLOSURE CONTAINING SENSITIVE EQUIPMENT

FIELD OF THE INVENTION

The present invention relates to a filter for trapping airborne particles within an enclosure containing sensitive equipment.

BACKGROUND OF THE INVENTION

The operation of certain computer equipment can be negatively affected by the presence of environmental hazards, such as airborne contaminants. To prevent this harm from occurring, sensitive equipment may be housed in an enclosure that is designed to keep out airborne contaminants.

An example of sensitive equipment housed within a protective enclosure is a hard disk drive (HDD). An HDD is a non-volatile storage device, which is housed in a protective enclosure, that stores digitally encoded data on one or more circular platters having magnetic surfaces. When an HDD is in operation, each platter is rapidly rotated by a spindle system. Data is read from and written to a platter using a read/write head which is positioned over a specific location on a platter by an actuator.

A read/write head uses a magnetic field to read data from and write data to the surface of a platter. As a magnetic dipole field decreases rapidly with distance from a magnetic pole, the space between a read/write head and the surface of a platter must be tightly controlled. To provide a uniform distance between a read/write head and the surface of a platter, an actuator relies on air pressure inside the hard drive enclosure to support the read/write heads at the proper distance away from the surface of a platter while the platter rotates. A read/write head therefore is said to "fly" over the surface of a platter. That is, the air pulled along by a spinning platter forces the head away from the surface of the platter. When a platter stops spinning, a read/write head must either "land" or be pulled away. Airborne contaminants, such as dust, can distort the surface of either a read/write head or a platter. Very small airborne particles, such as the size of a few microns, may distort the surface of either a read/write head or a platter. When the surface of either a read/write head or a platter becomes distorted, it is more likely that a read/write head may scrape across the surface of a platter, which may grind away the thin magnetic film of the platter and cause data loss and potentially render the HDD inoperable.

When a HDD is in operation, the air inside the enclosure of the HDD is constantly circulating due to the spinning of the platters. The circulating air typically passes through an internal recirculation filter to remove any contaminants that may be left over from manufacture, inadvertently introduced into the HDD enclosure, or generated internally in normal operation of the HDD.

SUMMARY OF THE INVENTION

Approaches are described for a filter for trapping airborne particles within an enclosure containing sensitive equipment. It is observed that many recirculation filters rely upon the air pressure, resulting from the circulation of air caused by the rotating of the platters within an HDD, to trap airborne particles upon the surface of a recirculation filter. However, when the air within the HDD slows or stops circulating, as would be expected when the platters within the HDD stop rotating, the air pressure against the recirculation filter decreases. When the air pressure against the recirculation filter drops, airborne particles trapped by the recirculation filter may fall off the recirculation filter. Thereafter, when the platters start rotating again, and the air within the HDD starts circulating, the circulating air may pick up and carry particles that fell off the recirculation filter. Additionally, vibrations caused by the normal operation of an HDD may cause particles trapped by a recirculation filter to be knocked loose of the recirculation filter. Thus, certain recirculation filters allow some trapped airborne particles to escape the recirculation filter, which is undesirable as the escaped airborne particles may ultimately cause damage to the surface of a platter within the HDD.

Advantageously, embodiments of the invention provide for a recirculation filter which does not rely solely upon air pressure to trap particles. It is observed that many airborne particles within an HDD are of stainless steel material. For example, the stainless steel particles may be generated during the HDD assembly process (for example, during the screw fastening process or from the interaction of HDD components) or from the wear and tear of HDD components during normal operation.

Accordingly, in an embodiment, a recirculation filter comprises a magnetic plate enclosed by a protective layer, which in turn may be enclosed by a non-woven scrim layer. The magnetic plate has a magnetic property that generates a magnetic field attractive to paramagnetic particles, such as particles of stainless steel material, within the enclosure. A paramagnetic particle is a particle that is attracted to a magnetic field. In this way, paramagnetic particles within the enclosure of the HDD will be attracted to the recirculation filter, and will not fall off the recirculation filter due to changes in air flow in the hard drive enclosure. Advantageously, the protective layer of the recirculation filter forms a barrier that prevents particles of the magnetic plate from entering into the hard drive enclosure.

Additional embodiments of the invention provide improved approaches for trapping non-paramagnetic particles, such as plastic, aluminum, NiP, dust, and other oxide particles, using a recirculation filter. To trap non-paramagnetic particles upon the recirculation filter, embodiments of the invention may employ a non-woven scrim layer that has an adhesive property which traps non-paramagnetic particles coming in contact with the non-woven scrim layer. Alternately, other embodiments may coat, at least a portion of, the non-woven scrim layer with an adhesive layer which traps non-paramagnetic particles coming in contact with the adhesive layer.

Embodiments of the invention may position a recirculation filter in a variety of locations within the enclosure of an HDD. Further, recirculation filters may have a variety of different shapes and sizes according to embodiments of the invention. While embodiments of the invention may be discussed in relation to a recirculation filter being employed in the interior of a hard drive enclosure, other embodiments of the invention may employ a recirculation filter in an enclosure containing sensitive equipment other than a hard disk drive.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

A filter for trapping airborne particles within an enclosure containing sensitive equipment is described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein. While embodiments of the invention shall be described with reference to a recirculation filter for use within the enclosure of a hard disk drive (HDD), recirculation filters according to embodiments of the invention may be employed in a variety of different enclosures that contain sensitive equipment.

Filter Composition

To avoid any particles from falling off a recirculation filter (potentially as a result of a variation in air flow within the enclosure of a HDD or due to vibrations in the normal operation of a HDD), recirculation filters according to embodiments of the invention employ improved mechanisms to trap particles on the recirculation filter.

Figure 1:
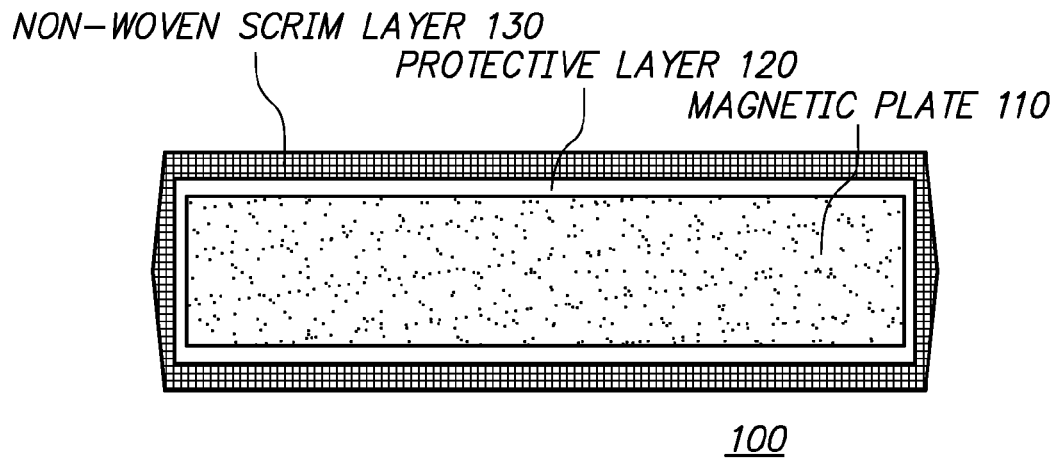
FIG. 1 is an illustration of a recirculation filter according to one embodiment of the invention.

FIG. 1 is an illustration of recirculation filter 100 according to an embodiment of the invention. Recirculation filter 100 may be positioned within an enclosure of an HDD for purposes of trapping airborne particles on the recirculation filter.

Recirculation filter 100 comprises magnetic plate 110, protective layer 120, and non-woven scrim layer 130. Magnetic plate 110 may be implemented by any material which may be used to generate a magnetic field. For example, in an embodiment, magnetic plate 110 may be implemented using a ferromagnetic material, such as iron, nickel, or cobalt. Alternately, in an embodiment not depicted in FIG. 1, magnetic plate 110 may be implemented using an electromagnet. The magnetic field generated by magnetic plate 110 should be strong enough to attract paramagnetic particles to non-woven scrim 130 of recirculation filter 110, but not strong enough to interfere with the operation of sensitive equipment within the enclosure of a HDD.

Protective layer 120 may be implemented by any material that may be used to form a protective barrier that prevents particles of magnetic plate 110 from entering into the enclosure of the HDD, which may cause operational problems to the HDD (such as failure of a disk drive). Non-limiting, illustrative examples of protective layer 120 include nickel plating, a polymer coating, and a plastic coating.

Non-woven scrim layer 130 may be implemented using any material conducive to trapping airborne particles therein. For example, non-woven scrim layer 130 may be constructed using a non-woven mesh material. Non-woven scrim layer 130 functions to trap any airborne particles coming in contact therewith.

In an embodiment, recirculation filter 110 may lack non-woven scrim layer 130. Thus, a recirculation filter according to embodiments of the invention may not include non-woven scrim layer 130. In such an embodiment, the recirculation filter is comprised of a magnetic plate surrounded by a protective layer, and airborne particles which are attracted to the magnetic field generated by the magnetic plate may become trapped against the protective layer, as the protective layer is the exposed, exterior surface of the recirculation filter in such an embodiment.

In theory, non-woven scrim layer 130 may actually be implemented using woven material; however, the composition of non-woven scrim layer 130 should not introduce any additional airborne particles into the enclosure of the HDD, and as woven materials tend to produce unwanted airborne particles, most woven scrims would not be appropriate in constructing non-woven scrim layer 130.

In an embodiment, recirculation filter 100 may be positioned within the enclosure of an HDD. The magnetic field generated by magnetic plate 110 causes any paramagnetic particles within range of the magnetic field to be attracted to recirculation filter 100. As a result, the paramagnetic particles attracted by the magnetic field will be drawn towards recirculation filter 100, and will collect in non-woven scrim layer 130. Consequently, if there is a variation in the air flow within the enclosure of the HDD, or if recirculation filter experiences vibrations, no paramagnetic particles will fall off recirculation filter 100, as the magnetic field generated by magnetic plate 110 will keep the paramagnetic particles trapped against the surface of non-woven scrim layer 130.

Optional Adhesive Layer

Figure 2:
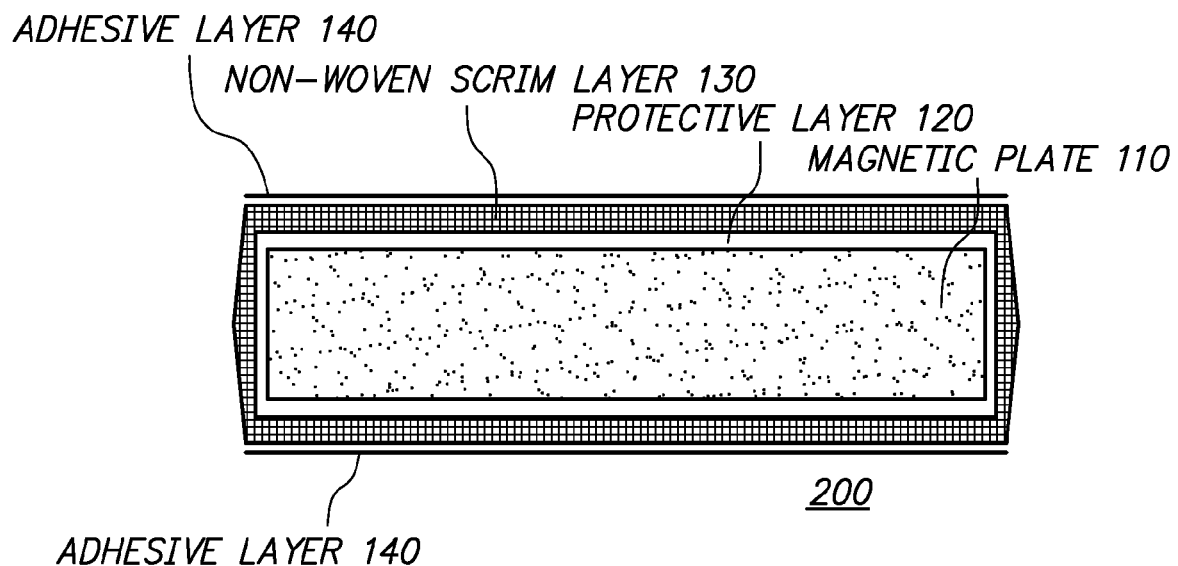
FIG. 2 is an illustration of a recirculation filter according to another embodiment of the invention.

Embodiments of the invention may also trap non-paramagnetic particles with greater effectiveness than prior approaches, as embodiments may trap non-paramagnetic particles within an adhesive layer. FIG. 2 is an illustration of recirculation filter 200 according to an embodiment of the invention. Recirculation filter 200 comprises magnetic plate 110, protective layer 120, non-woven scrim layer 130, and adhesive layer 140. Recirculation filter 200 is similar to recirculation filter 100 discussed above, except recirculation filter 200 additionally includes adhesive layer 140.

In an embodiment, at least a portion of non-woven scrim layer is covered with adhesive layer 140. Adhesive layer 140 may be implemented by any material that traps non-paramagnetic particles coming in contact with adhesive layer 140. As organic particles and other non-paramagnetic particles are not attracted by the magnetic field generated by magnetic plate 110, adhesive layer 140 serves to trap those particles not attracted by the magnetic field generated by magnetic plate 110. Non-limiting, illustrative examples of materials which adhesive layer 140 may be constructed of includes pressure sensitive adhesive, acrylic, double-sided tape, and any other material which has an adhesive property which may be used to trap non-paramagnetic airborne particles.

In an embodiment, adhesive layer 140 may completely enclose non-woven scrim layer 130 of recirculation filter 200. In another embodiment, adhesive layer 140 may only cover a portion of non-woven scrim layer 130 of recirculation filter 200. For example, adhesive layer 140 may only cover a portion of non-woven scrim layer 130 that is in the path of air flow within the enclosure of the HDD. Such an embodiment is depicted in FIG. 2, as only the longest sides of recirculation filter 200 depicted in FIG. 2 are coated with adhesive layer 140, and the shortest sides of recirculation filter 200 depicted in FIG. 2 are not coated with adhesive layer 140.

In an alternate embodiment, the recirculation filter of an embodiment may lack an adhesive layer, and the non-woven scrim layer 130 may have an adhesive property. To illustrate, non-woven scrim layer 130 of recirculation filter 100 of FIG. 1 may have an adhesive property which causes non-woven scrim layer 130 to trap non-paramagnetic particles coming in contact with non-woven scrim layer 130. In effect, in this embodiment, non-woven scrim layer 130 and adhesive layer 140 are combined into a single layer. In such an embodiment, non-woven scrim layer 130 may be constructed using any material conducive to trapping airborne particles therein which has an adhesive property.

Advantageously, embodiments of the invention employing either recirculation filter 200 or recirculation filter 100 having a non-woven scrim layer 130 with an adhesive property (for ease of reference, both of these types of recirculation filters shall be referred to as "adhesive recirculation filters") enable airborne particles that are either paramagnetic and non-paramagnetic in nature to be trapped on the surface of the adhesive recirculation filter. Consequently, if there is a variation in the air flow within the enclosure of the HDD, or if an adhesive recirculation filter experiences vibrations, no paramagnetic or non-paramagnetic particles will fall off the adhesive recirculation filter, as either the magnetic field generated by magnetic plate 110 or the adhesive property of the exposed surface of the adhesive recirculation filter will keep the paramagnetic particles and non-paramagnetic particles trapped against the surface of the adhesive recirculation filter.

In an embodiment where a recirculation filter lacks a non-woven scrim layer, the protective layer of the recirculation filter may have an adhesive property as discussed above. In such an embodiment, a recirculation filter may comprise a magnetic plate which generates a magnetic field attractive to paramagnetic particles, and the magnetic plate may be surrounded by a protective layer which has an adhesive property that traps non-paramagnetic airborne particles coming in contact with the protective layer.

Position and Orientation of Recirculation Filter

Recirculation filters according to embodiments of the invention may be positioned in a variety of different locations within an enclosure of a HDD or other such enclosure for sensitive equipment. In an embodiment, recirculation filters according to embodiments of the invention may be positioned in any location within an enclosure of a HDD such that the recirculation filter (a) prevents airborne particles from being blown directly upon a platter, a read/write head, or other sensitive equipment and/or (b) is ideally situated to collect airborne particles within air circulating within the enclosure of the HDD.

Figure 5:
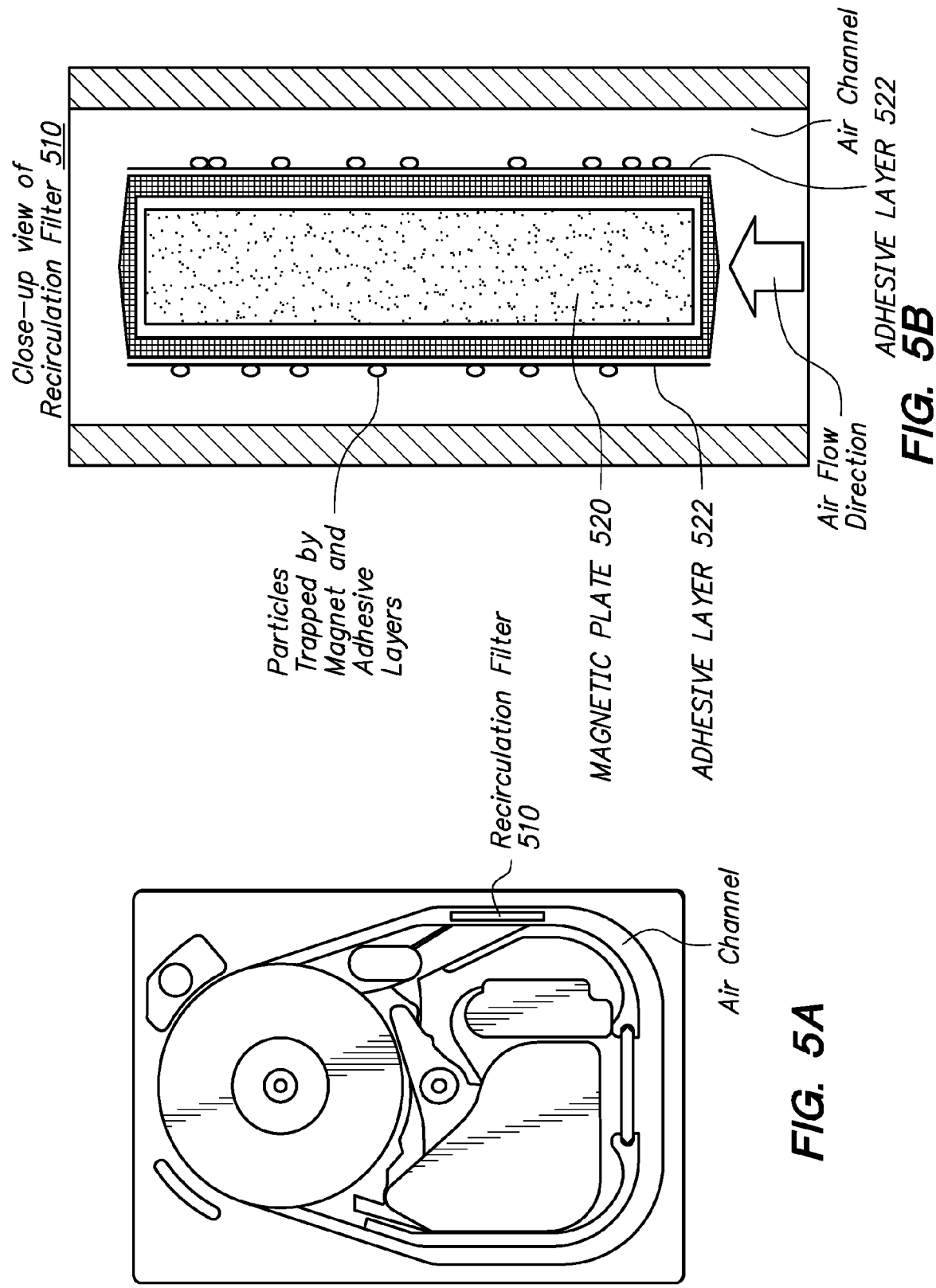
FIG. 5A is an illustration of a recirculation filter whose longest dimension runs parallel with respect to the direction of the flow of air according to an embodiment of the invention.
FIG. 5B is an illustration of a magnified view of the recirculation filter depicted in FIG. 5A according to an embodiment of the invention.

The flow of air circulating within a hard drive enclosure is referred to as an air channel. For example, FIG. 5 depicts an air channel within the enclosure of a HDD. A recirculation filter according to an embodiment may be positioned within an air channel of a hard disk drive, and may optionally cause the air flow within the hard drive enclosure to be directed away from one or more hard disk platters or a read/write head within the hard drive enclosure.

Figure 3B:
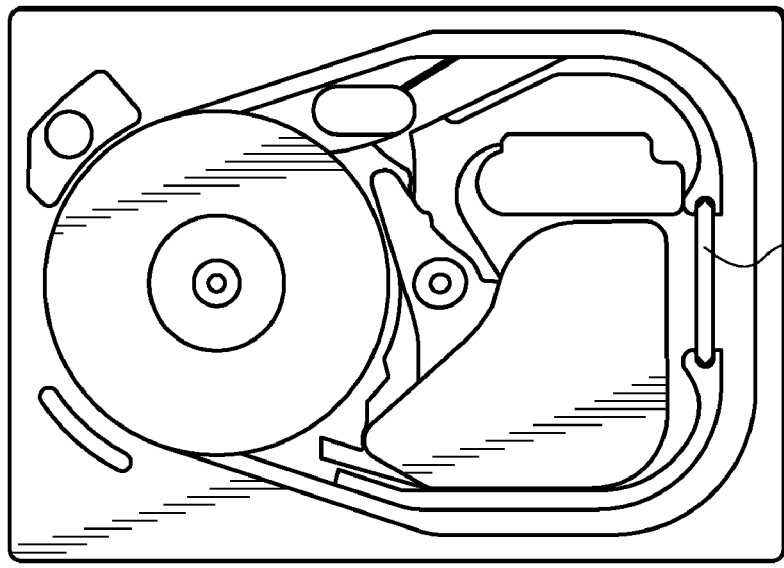
FIG. 3B is an illustration of another exemplary location in an enclosure of a hard disk drive for a recirculation filter according to an embodiment of the invention.
Figure 3A:
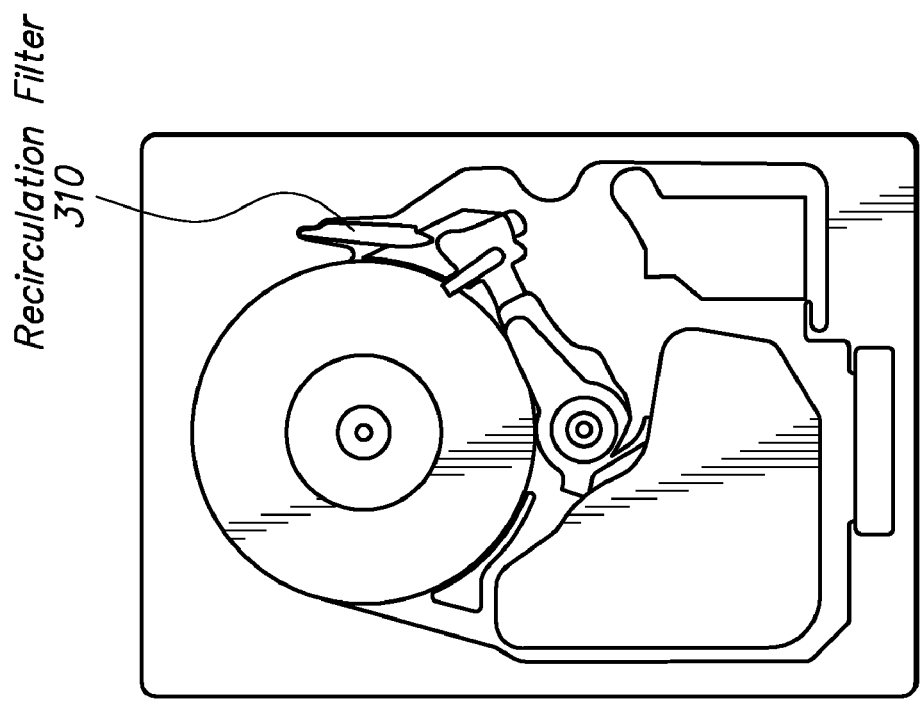
FIG. 3A is an illustration of an exemplary location in an enclosure of a hard disk drive for a recirculation filter according to an embodiment of the invention.
Figure 4:
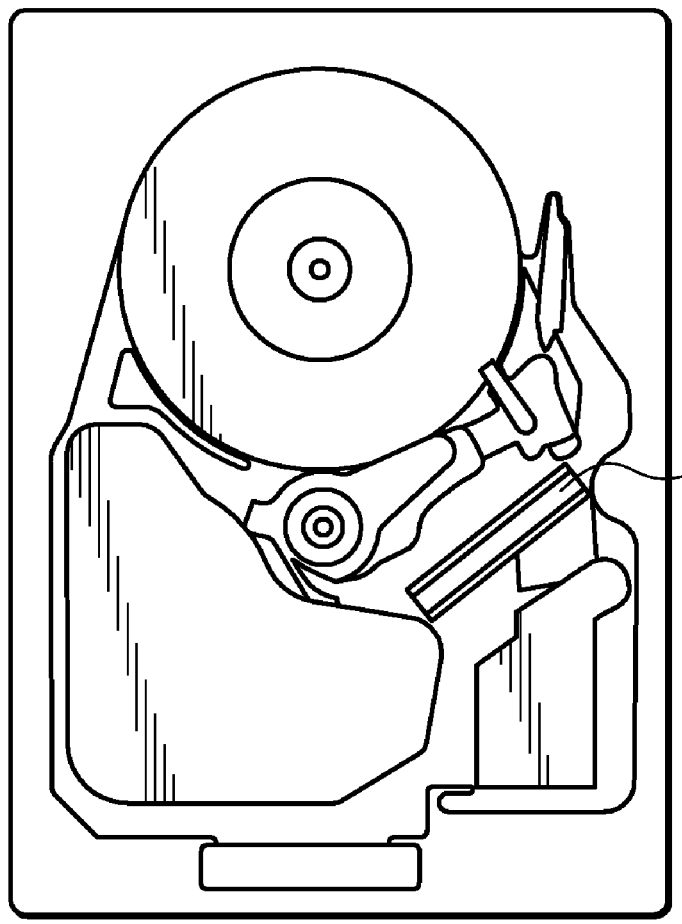
FIG. 4 is an illustration of another exemplary location in an enclosure of a hard disk drive for a recirculation filter according to an embodiment of the invention.

To illustrate, FIGS. 3A, 3B, and 4 illustrate several exemplary locations for a recirculation filter in a hard disk enclosure according to an embodiment of the invention. As shown in FIGS. 3A, 3B, and 4, recirculation filter 100 or 200 may be positioned in a variety of different locations within a hard drive enclosure. For example, recirculation filter 310 of FIG. 3A is positioned such that the flow of air in the air channel will be deflected by recirculation filter 310, thereby preventing airborne particles carried by the air circulating in the air channel from being blown directly upon a platter or a read/write head. Recirculation filter 410 of FIG. 4 depicts another position where a recirculation filter of an embodiment may be affixed within an enclosure of a HDD. While recirculation filter 410 is in a different position in an enclosure of a HDD than recirculation filter 310, recirculation filter 410 also helps prevent airborne particles carried by air circulating within the enclosure of the HDD from being blown directly upon a platter or a read/write head as shown in FIG. 4.

Recirculation filters according to embodiments of the invention may be positioned in a variety of different orientations in an air channel with respect to the direction of the flow of air. For example, the orientation of the longest side of the recirculation filter may be substantially parallel to a direction of air flow within the hard drive enclosure, as shown by recirculation filter 320 of FIG. 3B and in FIG. 5A, which is an illustration of a recirculation filter whose longest dimension runs parallel with respect to the direction of the flow of air according to an embodiment of the invention. As shown in FIG. 5A, recirculation filter 510 resides entirely within an air channel of an HDD.

FIG. 5B is an illustration of a magnified view of recirculation filter 510 depicted in FIG. 5A according to an embodiment of the invention. As shown in FIG. 5B, airborne particles that are carried by the air flowing in the air channel may become trapped on the exterior of recirculation filter 510. Airborne particles may become trapped on recirculation filter due to the magnetic field generated by magnetic plate 520 of recirculation filter 510 or by an exterior surface of recirculation filter 510 which has an adhesive property, such as adhesive layer 522. As shown in FIG. 5B, adhesive layer 522 covers the sides of recirculation filter 510 which run parallel to the direction of air flowing in the air channel, but adhesive layer 522 does not cover the sides of recirculation filter 510 which run perpendicular to the direction of air flowing in the air channel. As any exterior surface of recirculation filter 510 may have an adhesive property which may serve to trap non-paramagnetic airborne particles coming in contact therewith, in other embodiments of the invention not depicted in FIG. 5B, adhesive layer 522 may cover the sides of recirculation filter 510 which run perpendicular to the direction of air flowing in the air channel.

In other embodiments of the invention (such as the embodiments depicted in FIG. 3A and FIG. 4), the orientation of the length of the recirculation filter may be at any angle to a direction of air flow within the enclosure of the HDD. Preferably, the recirculation filter will be positioned at an angle to the air channel such that the recirculation filter does not offer an unreasonable amount of resistance to the flow of air. Thus, the position of the recirculation filter should be selected such that airborne particles carried by an air channel are likely to make contact with the recirculation filter without adding an unreasonable amount of resistance to the flow of air within the enclosure of the HDD.

Magnetism Considerations

In an embodiment, the position of the recirculation filter and the size and shape of magnetic plate 110 is based upon ensuring that the magnetic field generated by magnetic plate 110 does not interfere with the operation of the sensitive equipment within the enclosure containing the recirculation filter. For example, the magnetic field generated by magnetic plate 110 should not affect the reading or writing of data to or from any platters within the enclosure of a HDD. Thus, while a recirculation filter according to embodiments of the invention may be of a variety of different shapes and sizes, the dimension and position of the recirculation filter should be selected to avoid interference with a platter or read/write head within the enclosure of the HDD in an embodiment.

Shape of Filter

In an embodiment, recirculation filter 100 or 200 may be any shape. Thus, while the recirculation filters of the embodiments depicted in FIGS. 2-5 are substantially straight, other embodiments of the invention may employ recirculation filters having different shapes, such as a curved shape. The shape of a recirculation filter according to an embodiment of the invention should be designed to regulate the flow of air to prevent airborne particles from being blown onto sensitive equipment, such as a platter or a read/write head. The selection of a shape for a recirculation filter according to an embodiment may be influenced by the intended position to which the recirculation filter will be affixed. In other words, the shape and location of a recirculation filter may be selected to achieve the goals of (a) preventing airborne particles from being blown directly upon a platter, a read/write head, or other sensitive equipment and (b) collecting airborne particles within air circulating within the HDD enclosure. The shape of a recirculation filter should not create an unreasonable amount of resistant to the flow of air within the HDD enclosure according to an embodiment.

Manufacturing a Recirculation Filter

Figure 6:
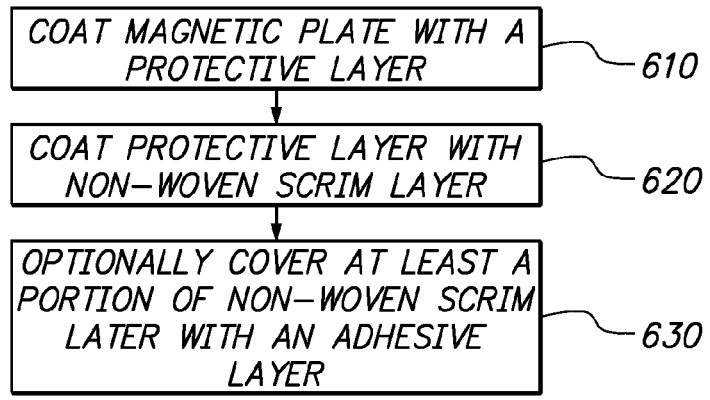
FIG. 6 is a flowchart illustrating the functional steps of manufacturing a recirculation filter according to an embodiment of the invention.

FIG. 6 is a flowchart illustrating the functional steps of manufacturing a recirculation filter according to an embodiment of the invention. In step 610, magnetic plate 110 is coated with protective layer 120. Thereafter, in step 620, protective layer 120 is coated with non-woven scrim layer 130. In an embodiment, non-woven scrim layer 130 may have an adhesive property as discussed above. Subsequently, in optional step 630, non-woven scrim 130 is at least partially coated with adhesive layer 140. Note that if non-woven scrim layer 130 has an adhesive property, then it may not be desirable to perform step 630. By performing the steps of FIG. 6, recirculation filter 100 or 200 discussed above may be manufactured.

Physical Description of Illustrative Embodiments of the Invention

Figure 7:
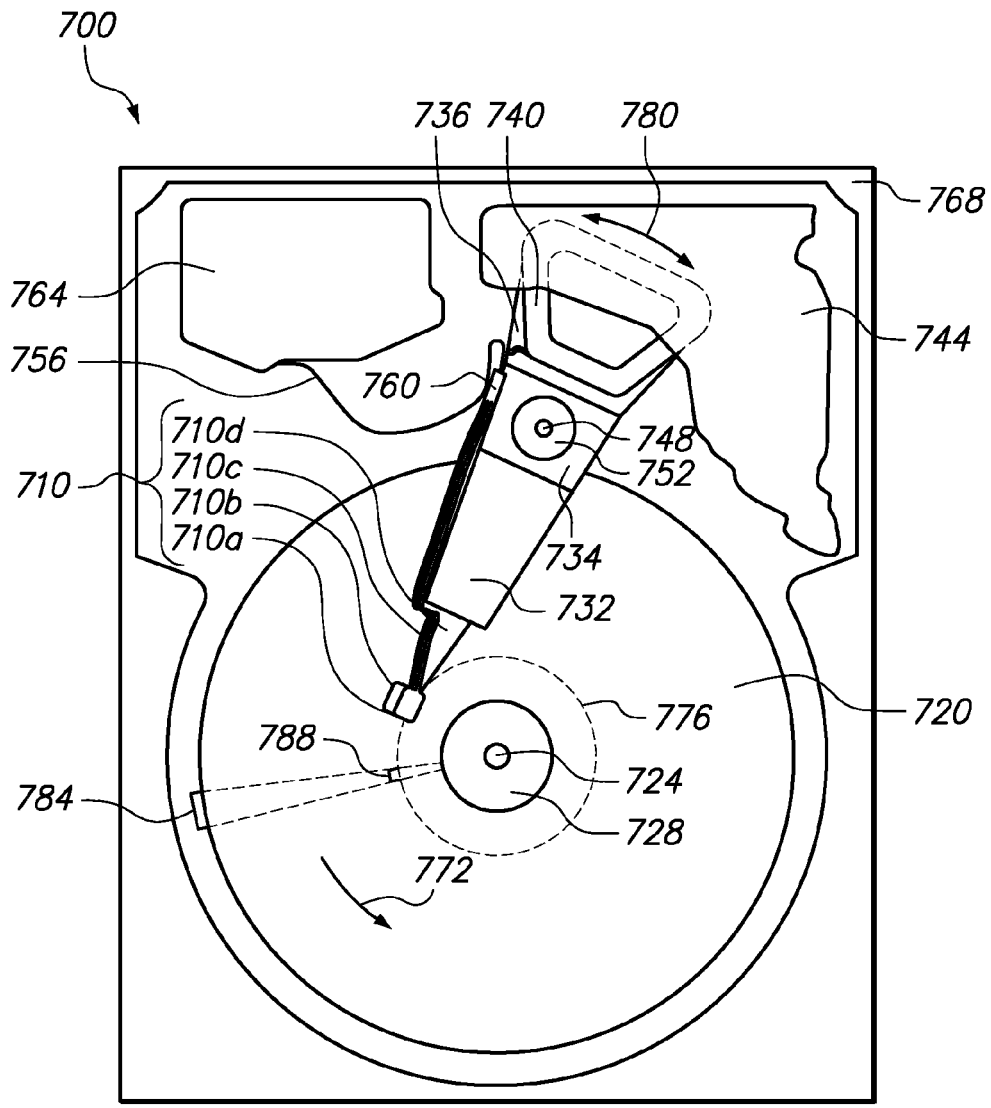
FIG. 7 is a plan view of an illustrative HDD according to an embodiment of the invention.

With reference to FIG. 7, in accordance with an embodiment of the present invention, a plan view of a HDD 700 is shown. FIG. 7 illustrates the functional arrangement of components of the HDD including a slider 710b including a magnetic-recording head 710a. The HDD 700 includes at least one HGA 710 including the head 710a, a lead suspension 710c attached to the head 710a, and a load beam 710d attached to the slider 710b, which includes the head 710a at a distal end of the slider 710b; the slider 710b is attached at the distal end of the load beam 710d to a gimbal portion of the load beam 710d. The HDD 700 also includes at least one magnetic-recording disk 720 rotatably mounted on a spindle 724 and a drive motor (not shown) attached to the spindle 724 for rotating the disk 720. The head 710a includes a write element, a so-called writer, and a read element, a so-called reader, for respectively writing and reading information stored on the disk 720 of the HDD 700. The disk 720 or a plurality (not shown) of disks may be affixed to the spindle 724 with a disk clamp 728. The HDD 700 further includes an arm 732 attached to the HGA 710, a carriage 734, a voice-coil motor (VCM) that includes an armature 736 including a voice coil 740 attached to the carriage 734; and a stator 744 including a voice-coil magnet (not shown); the armature 736 of the VCM is attached to the carriage 734 and is configured to move the arm 732 and the HGA 710 to access portions of the disk 720 being mounted on a pivot-shaft 748 with an interposed pivot-bearing assembly 752.

With further reference to FIG. 7, in accordance with an embodiment of the invention, electrical signals, for example, current to the voice coil 740 of the VCM, write signal to and read signal from the PMR head 710a, are provided by a flexible cable 756. Interconnection between the flexible cable 756 and the head 710a may be provided by an arm-electronics (AE) module 760, which may have an on-board pre-amplifier for the read signal, as well as other read-channel and write-channel electronic components. The flexible cable 756 is coupled to an electrical-connector block 764, which provides electrical communication through electrical feedthroughs (not shown) provided by an HDD housing 768. The HDD housing 768, also referred to as a casting, depending upon whether the HDD housing is cast, in conjunction with an HDD cover (not shown) provides a sealed, protective enclosure for the information storage components of the HDD 700.

With further reference to FIG. 7, in accordance with an embodiment of the invention, other electronic components (not shown), including a disk controller and servo electronics including a digital-signal processor (DSP), provide electrical signals to the drive motor, the voice coil 740 of the VCM and the head 710a of the HGA 710. The electrical signal provided to the drive motor enables the drive motor to spin providing a torque to the spindle 724 which is in turn transmitted to the disk 720 that is affixed to the spindle 724 by the disk clamp 728; as a result, the disk 720 spins in a direction 772. The spinning disk 720 creates a cushion of air that acts as an air-bearing on which the air-bearing surface (ABS) of the slider 710b rides so that the slider 710b flies above the surface of the disk 720 without making contact with a thin magnetic-recording medium of the disk 720 in which information is recorded. The electrical signal provided to the voice coil 740 of the VCM enables the head 710a of the HGA 710 to access a track 776 on which information is recorded. Thus, the armature 736 of the VCM swings through an arc 780 which enables the HGA 710 attached to the armature 736 by the arm 732 to access various tracks on the disk 720. Information is stored on the disk 720 in a plurality of concentric tracks (not shown) arranged in sectors on the disk 720, for example, sector 784. Correspondingly, each track is composed of a plurality of sectored track portions, for example, sectored track portion 788. Each sectored track portion 788 is composed of recorded data and a header containing a servo-burst-signal pattern, for example, an ABCD-servo-burst-signal pattern, information that identifies the track 776, and error correction code information. In accessing the track 776, the read element of the head 710a of the HGA 710 reads the servo-burst-signal pattern which provides a position-error-signal (PES) to the servo electronics, which controls the electrical signal provided to the voice coil 740 of the VCM, enabling the head 710a to follow the track 776. Upon finding the track 776 and identifying a particular sectored track portion 788, the head 710a either reads data from the track 776 or writes data to the track 776 depending on instructions received by the disk controller from an external agent, for example, a microprocessor of a computer system.

Embodiments of the invention also encompass HDD 700 that includes the HGA 710, the disk 720 rotatably mounted on the spindle 724, the arm 732 attached to the HGA 710 including the slider 710b including the head 710a. Embodiments of the invention incorporate within the environment of the HDD 700, without limitation, the embodiments of the invention for a filter for filtering airborne particles within a hard disk drive enclosure. Similarly, embodiments of the present invention incorporate within the environment of the HGA 710, without limitation, the embodiments of the invention for a filter for filtering airborne particles within a hard disk drive enclosure.

Figure 8:
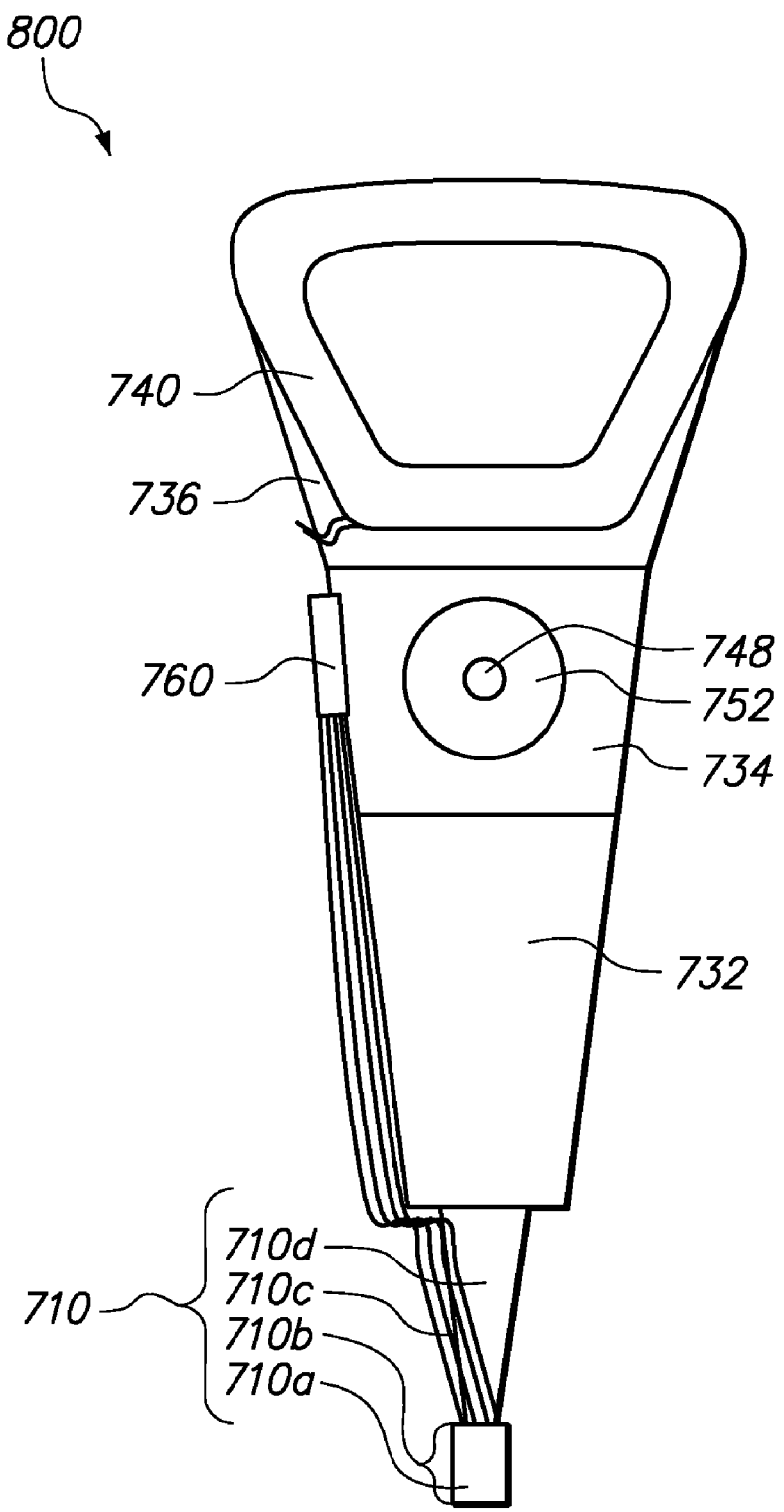
FIG. 8 is a plan view of a head-arm-assembly (HAA) according to an embodiment of the invention.

With reference now to FIG. 8, in accordance with an embodiment of the present invention, a plan view of a head-arm-assembly (HAA) 800 including the HGA 710 is shown. FIG. 8 illustrates the functional arrangement of the HAA with respect to the HGA 710. The HAA includes the arm 732 and HGA 710 including the slider 710b including the head 710a. The HAA is attached at the arm 732 to the carriage 734. In the case of an HDD having multiple disks, or platters as disks are sometimes referred to in the art, the carriage 734 is called an "E-block," or comb, because the carriage is arranged to carry a ganged array of arms that gives it the appearance of a comb. As shown in FIG. 8, the armature 736 of the VCM is attached to the carriage 734 and the voice coil 740 is attached to the armature 736. The AE 160 may be attached to the carriage 734 as shown. The carriage 734 is mounted on the pivot-shaft 748 with the interposed pivot-bearing assembly 752.

While several embodiments of the invention have been discussed with reference to a recirculation filter positioned within the enclosure of a HDD, other embodiments of the invention may employ a recirculation filter 100 or 200 in an enclosure containing other sensitive computer equipment, such as atmospheric testing equipment, computerized measuring equipment, and optical storage drives.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
   an enclosure;
   a magnetic-recording head;
   a magnetic-recording disk rotatably mounted on a spindle; and
   a filter positioned within the interior of said enclosure, wherein said filter comprises a magnetic plate enclosed by a protective layer, wherein said magnetic plate has a magnetic property that generates a magnetic field attractive to paramagnetic particles within said enclosure, and wherein said protective layer forms a barrier that prevents particles of said magnetic plate from entering into said enclosure.

2. The hard-disk drive of claim 1, wherein the protective layer is nickel plating.

3. The hard-disk drive of claim 1, wherein the protective layer is a polymer or plastic coating.

4. The hard-disk drive of claim 1, wherein the position of the filter within the enclosure causes the magnetic field to not affect reading or writing data to or from the magnetic-recording disk within the enclosure.

5. The hard-disk drive of claim 1, wherein the orientation of the length of the filter is substantially parallel to a direction of air flow within the enclosure.

6. The hard-disk drive of claim 1, wherein the filter causes an air flow within the enclosure to be directed away from the magnetic-recording disk within the enclosure.

7. The hard-disk drive of claim 1, wherein the filter has a curved shape, and wherein the curved shape causes an air flow within the enclosure to be directed away from the magnetic-recording disk within the enclosure.

8. The hard-disk drive of claim 1, wherein a least a portion of said protective layer is covered by a non-woven scrim layer.

9. The hard-disk drive of claim 8, wherein the non-woven scrim layer has an adhesive property which causes the non-woven scrim layer to trap non-paramagnetic particles coming in contact therewith.

10. The hard-disk drive of claim 8, wherein the non-woven scrim layer is adapted to collect the airborne particles coming in contact therewith.

11. The hard-disk drive of claim 8, wherein the non-woven scrim layer is composed of a pressure sensitive adhesive, acrylic, or double-sided tape.

12. The hard-disk drive of claim 1, wherein said filter is positioned in the path of an air flow circulating within said enclosure.

13. The hard-disk drive of claim 1, wherein at least a portion of the surface of the filter has an adhesive property which causes the surface to trap non-paramagnetic particles coming into contact therewith, and wherein said filter is positioned with the enclosure to prevent airborne particles from being blown directly upon the magnetic-recording disk or the magnetic-recording head.

14. A filter for filtering airborne particles present within an enclosure containing equipment sensitive to airborne particles, comprising:
   a filter positioned within the enclosure, wherein said filter comprises a magnetic plate enclosed by a protective layer, wherein said protective layer is enclosed by a non-woven scrim layer, wherein at least a portion of the non-woven scrim layer is covered with an adhesive layer that traps non-paramagnetic particles coming in contact therewith,
   wherein said magnetic plate has a magnetic property that generates a magnetic field attractive to paramagnetic particles within the enclosure, and
   wherein said protective layer forms a barrier that prevents particles of said magnetic layer from entering into the enclosure.

15. The filter of claim 14, wherein the adhesive layer covers a majority portion of the longest sides of the filter.

16. The filter of claim 14, wherein the adhesive layer is composed of a pressure sensitive adhesive, acrylic, or double-sided tape.

17. The filter of claim 14, wherein said filter is positioned inside an air flow circulating with the enclosure.

18. A method for manufacturing a filter for use in a hard disk drive, comprising:
   apply a protective layer around the exterior of a magnetic plate to enclose the magnetic plate in the protective layer; and
   apply a non-woven scrim layer around the exterior of the protective layer to enclose the protective layer in the non-woven scrim.

19. The method of claim 18, further comprising:
   applying an adhesive layer to at least a portion of the protective layer, wherein an airflow circulating within a hard drive enclosure of said hard disk drive makes contact with said portion.

20. The method of claim 18, further comprising:
   affixing said filter to a position in an enclosure of said hard disk drive, wherein said position of said filter causes an air flow within the enclosure to be directed away from one or more platters within the enclosure.

21. The method of claim 18, wherein said non-woven scrim layer has an adhesive property, and wherein said non-woven scrim layer traps non-paramagnetic particles coming in contact therewith using said adhesive property.

* * * * *